(No Model.)
G. B. DURKEE & D. LANTERMAN.
HARP.
No. 485,737. Patented Nov. 8, 1892.
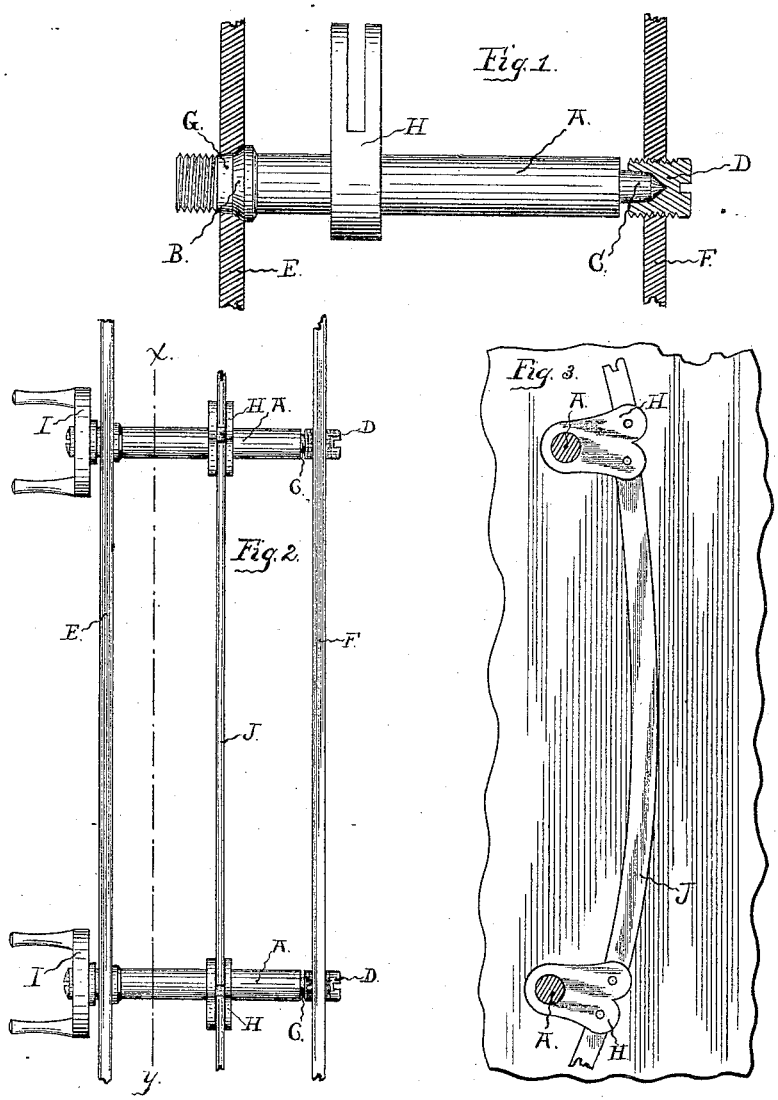
Witnesses
Thomas F. Mullany
Patrick J. Keough
Inventors
George B. Durkee
Daniel Lanterman

UNITED STATES PATENT OFFICE.

GEORGE B. DURKEE AND DANIEL LANTERMAN, OF CHICAGO, ILLINOIS.

HARP.

SPECIFICATION forming part of Letters Patent No. 485,737, dated November 8, 1892.

Application filed March 7, 1892. Serial No. 424,079. (No model.)

*To all whom it may concern:*

Be it known that we, GEORGE B. DURKEE and DANIEL LANTERMAN, citizens of the United States, residing at Chicago, in the county of Cook and State of Illinois, have invented a new and useful Improvement in Harps, of which the following is a specification.

The object of our invention is to provide a suitable means of adjustment for taking up the lost motion of the sharping-mandrels from wear in the brass sides or "comb" of the harp; and this object we attain by forming a taper or bevel collar on the mandrels and by providing an adjustable screw-bearing for taking up lateral motion, substantially as pointed out in drawings forming a part of this specification, in which—

Figure 1 is an enlarged view showing our improved mandrel A, with the bevel-collar B and adjusting-screw D. Figs. 2 and 3 are views showing position of mandrels and octave-couplers in a section of the comb.

In Fig. 1, A represents the mandrel in its exact position in the comb. B and G show the bevel-collar and tapered portion of mandrel A, which works in plate E. D shows the adjusting-screw, and C the end of mandrel A, tapered and fitted into a taper socket in the adjusting-screw D. E and F are the brass sides which form a part of the comb. J shows octave-coupler. H is an arm on mandrel, which connects octave-couplers, and I is a fork disk attached to mandrel A, showing its position when on harp.

Heretofore in harp construction straight mandrels have been used, which passed through straight holes in the brass sides, and in working and performing their functions they would eventually wear away the brass and become loose in their bearings, thereby causing a rattling noise when used. These enlarged holes had to be closed in by tamping, which consisted of striking small holes in the brass around the mandrel with a tool for swedging the brass in. This process necessitated the employing of a machinist or mechanic capable of doing such work. To obviate these difficulties, we drill and ream a bevel-hole in the plate E, which exactly fits the bevel and taper B and G on mandrel A and also a taper socket in the adjusting-screw D, which receives the tapered end C of mandrel A. Now as soon as the taper hole in plate E is worn enough to cause the mandrel A to rattle or work too loosely in its bearings we turn the adjusting-screw D, which presses the mandrel A in the plate E, and thereby takes up lost motion at either end, as both ends of mandrel A work in taper bearings. We do not confine ourselves to any particular angle or taper, as it is evident that an angle passing entirely through the brass side would undoubtedly serve the purpose. Mandrel A, as shown in Fig. 1, is the taper and style we are now using in harp construction, and we find that it performs its functions admirably and without cutting or sticking. It can be very readily seen how much easier and simpler it is to adjust a harp with our improved mandrel than with the old style of mandrel, as with our improvement it can be adjusted with a small screw-driver to work tight or loose, according to the player's fancy.

Having thus described our invention, what we claim, and desire to secure by Letters Patent, is—

In the sharping-action of a harp, the male and female taper or cone bearing near the head of the mandrel, with adjustable cone-bearing nut at tail end of said mandrel, substantially as and for the purpose herein described.

GEORGE B. DURKEE.
DANIEL LANTERMAN.

Witnesses:
THOMAS F. MULTANY,
PATRICK J. KEOUGH.